(12) United States Patent
Yoshida

(10) Patent No.: US 10,567,916 B2
(45) Date of Patent: Feb. 18, 2020

(54) NON-TRANSITORY COMPUTER-READABLE RECORDING MEDIUM FOR RECORDING PROGRAM, TERMINAL DEVICE, WARNING SYSTEM, AND WARNING NOTIFICATION METHOD

(71) Applicant: SEIKO EPSON CORPORATION, Tokyo (JP)

(72) Inventor: Yutaka Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/166,367

(22) Filed: Oct. 22, 2018

(65) Prior Publication Data

US 2019/0124473 A1 Apr. 25, 2019

(30) Foreign Application Priority Data

Oct. 24, 2017 (JP) .................................. 2017-204897
Jul. 9, 2018 (JP) .................................. 2018-129677

(51) Int. Cl.
*G06F 3/12* (2006.01)
*H04W 4/024* (2018.01)
(Continued)

(52) U.S. Cl.
CPC ............. *H04W 4/024* (2018.02); *G01S 11/06* (2013.01); *G06F 3/1203* (2013.01); *G06F 3/1236* (2013.01); *G06F 3/1259* (2013.01); *G06F 3/1285* (2013.01); *G06F 3/1292* (2013.01); *H04N 1/00315* (2013.01);
(Continued)

(58) Field of Classification Search
CPC ....... H04W 4/024; H04W 4/80; H04W 64/00; H04N 1/00315; H04N 2201/0094; H04N 2201/0096; G01S 11/06; G06F 3/1203; G06F 3/1259; G06F 3/1285
See application file for complete search history.

(56) References Cited

U.S. PATENT DOCUMENTS 8,805,404 B1 *  8/2014  Yang .................. H04W 4/02
                                                          455/456.1
9,753,684 B1    9/2017  Najari et al.
(Continued)

FOREIGN PATENT DOCUMENTS

EP      3098704 A1    11/2016
JP    2017-010329 A    1/2017

OTHER PUBLICATIONS

European Search Report issued in Application No. 18202109 dated Dec. 14, 2018.

*Primary Examiner* — Moustapha Diaby
(74) *Attorney, Agent, or Firm* — Workman Nydegger

(57) ABSTRACT

A program causes a terminal device to function as a communication unit that receives a beacon signal and the processing unit. After an event to cause the communication unit to transmit a job to a target apparatus (electronic apparatus) occurs, or after a predetermined operation is performed by the terminal device in response to receiving a status from the target apparatus, in a case where it is determined that a user moves to an apparatus (non-target apparatus) different from the target apparatus, based on the received radio wave strength of the beacon signal from the target apparatus, the processing unit performs warning notification processing.

16 Claims, 9 Drawing Sheets

(51) Int. Cl.
*H04W 4/80* (2018.01)
*H04W 64/00* (2009.01)
*H04N 1/00* (2006.01)
*G01S 11/06* (2006.01)

(52) U.S. Cl.
CPC ............ *H04W 4/80* (2018.02); *H04W 64/00* (2013.01); *H04N 2201/0094* (2013.01)

(56) References Cited

U.S. PATENT DOCUMENTS

2012/0038948 A1 2/2012 Park
2015/0378296 A1* 12/2015 Kim .................. G03G 15/5091
399/80

* cited by examiner

FIG. 9
| BEACON IDENTIFIER (POSITION) | IDENTIFICATION INFORMATION OF ELECTRONIC APPARATUS (MAC ADDRESS) | RADIO WAVE STRENGTH BECOMING REFERENCE OF DISTANCE |
|---|---|---|
FIG. 10
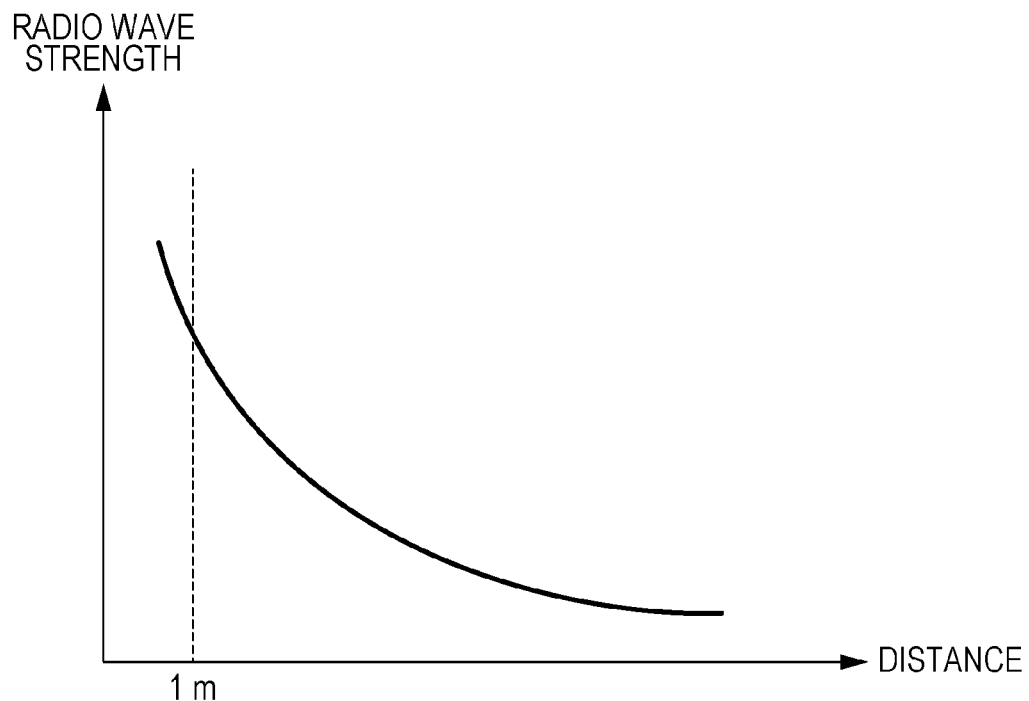
FIG. 11
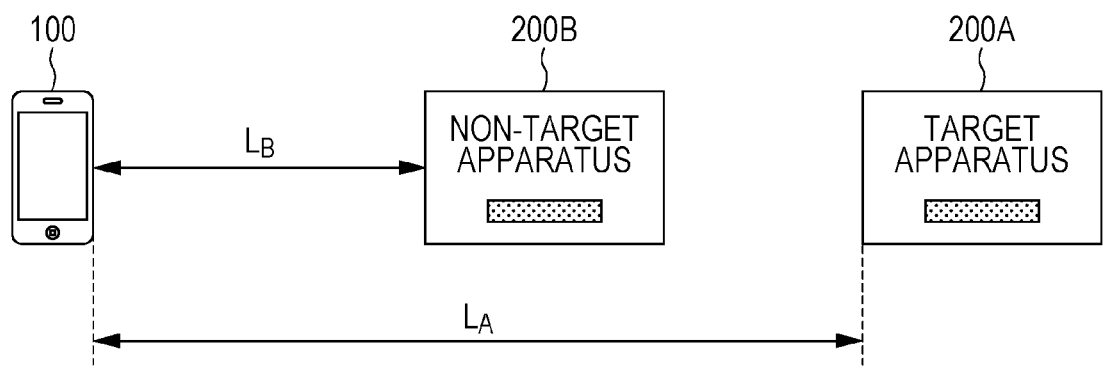

NON-TRANSITORY COMPUTER-READABLE RECORDING MEDIUM FOR RECORDING PROGRAM, TERMINAL DEVICE, WARNING SYSTEM, AND WARNING NOTIFICATION METHOD

BACKGROUND

1. Technical Field

The present invention relates to a non-transitory computer-readable recording medium for recording a program, a terminal device, a warning system, and a warning notification method.

2. Related Art

In the related art, there is known a method of receiving a beacon signal from another apparatus and determining a distance to another apparatus, based on the received beacon signal. For example, JP-A-2017-10329 discloses a method in which a mobile terminal receives an advertisement packet of Bluetooth low energy (BLE) (Bluetooth is a registered trademark) from a print device and calculates a distance between the mobile terminal and the print device, based on the received radio wave strength.

JP-A-2017-10329 discloses a method of displaying the print device having the closest distance to the mobile terminal on a print setting screen of the mobile terminal by default, and a method of changing a communication standard which is used from the BLE to a wireless LAN if the mobile terminal approaches within a certain distance from the print device.

In JP-A-2017-10329, by using the fact that a distance between the mobile terminal and the print device (printer) can be calculated, a certain processing is performed if the mobile terminal approaches the print device. However, in a case where there are a plurality of print devices, a user of the mobile device cannot be guided to an appropriate print device only by calculating the distance between the mobile terminal and the print device. For example, there is a concern that the user misunderstands a print device which does not execute a printing instruction as a print device which executes the printing instruction and moves to the print device which does not execute the printing instruction.

SUMMARY

An advantage of some aspects of the invention is to provide a non-transitory computer-readable recording medium for recording a program, a terminal device, a warning system, and a warning notification method that appropriately assists a movement of a user who uses the terminal device to a target apparatus in a case where a plurality of apparatuses exist.

According to an aspect of the invention, there is provided A non-transitory computer-readable recording medium for recording a program causing a terminal device to function as a communication unit that receives a beacon signal and a processing unit. After an event to cause the communication unit to transmit a job to a target apparatus occurs, or after a predetermined operation is performed in the terminal device based on the event that is generated by the processing unit in response to a status which is received by the communication unit from the target apparatus, in a case where it is determined that the terminal device moves to an apparatus different from the target apparatus, based on the received radio wave strength of the beacon signal which is received from the target apparatus by the communication unit, the processing unit performs warning notification processing.

Accordingly, in a case where it is determined that a terminal device moves to an apparatus different from a target apparatus after a given event relating to the target apparatus occurs, warning notification processing is performed. By doing so, it is possible to warn that a user who uses the terminal device moves to a different apparatus in a scene in which the user moves to the target apparatus, and thus, it is possible to appropriately assist movement of the user.

In the recording medium, the processing unit may determine whether or not the terminal device moves to an apparatus different from the target apparatus, based on a distance between the terminal device and the target apparatus which is determined based on the received radio wave strength.

As such, by determining a distance from a received radio wave strength, a determination based on a distance between a terminal device and a target apparatus can be made.

In the recording medium, in a case where the distance increases until the distance between the terminal device and the target apparatus is smaller than or equal to a given threshold, the processing unit may determine that the terminal device moves to an apparatus different from the target apparatus and performs the warning notification processing.

By doing so, it is possible to set a condition in which a distance to a target apparatus is smaller than or equal to a threshold as an end condition or to make a determination, based on a change in the distance to the target apparatus.

In the recording medium, in a case where it is determined that the terminal device moves to a second apparatus, based on a comparison result of a first distance between the terminal device and the target apparatus and a second distance between the terminal device and the second apparatus, which is determined based on the received radio wave strength of the beacon signal that is received by the communication unit from the second apparatus different from the target apparatus, the processing unit may perform the warning notification processing.

As such, a movement of a user can be accurately determined by using both a first distance to a target apparatus and a second distance between the target apparatus and another apparatus.

In the recording medium, in a case where the second distance decreases and the first distance increases until the first distance is smaller than or equal to a given threshold, the processing unit may perform the warning notification processing.

As such, a movement of a user can be accurately determined and warning notification processing can be performed in an appropriate situation by setting a decrease of a second distance and an increase of a first distance as a condition.

In the recording medium, in a case where the second distance decreases to a second threshold or more and the first distance increases until the first distance is smaller than or equal to the given threshold, the processing unit may perform the warning notification processing.

As such, performing warning notification processing can be suppressed in a situation where necessity is low by setting a change greater than or equal to a threshold as a condition.

In the recording medium, in a case where the second distance decreases and the first distance increases to a third threshold or more until the first distance is smaller than or equal to the given threshold, the processing unit may perform the warning notification processing.

As such, performing warning notification processing can be suppressed in a situation where necessity is low by setting a change greater than or equal to a threshold as a condition.

In the recording medium, the processing unit may perform the warning notification processing of notifying information indicating the first distance and information indicating a direction of the target apparatus.

As such, a movement of a user can be appropriately assisted by notifying additional information.

In the recording medium, the processing unit may specify an apparatus having a closest distance to the terminal device, based on a first distance between the terminal device and the target apparatus and second to Nth distances that is determined based on the received radio wave strength of the beacon signal which is received by the communication unit from second to Nth (N is an integer of 2 or more) apparatuses different from the target apparatus, and may perform the warning notification processing in a case where the specified apparatus is not the target apparatus.

By doing so, it is possible to determine whether or not a user moves to an apparatus different from a target apparatus from a viewpoint of whether or not the apparatus closest to the terminal device is the target apparatus.

In the recording medium, in a case where a state in which the specified apparatus is not the target apparatus is continued for a given period and the first distance is larger than or equal to a fourth threshold, the processing unit may perform the warning notification processing.

By doing so, in a case where it is determined that a user moves appropriately, the warning notification processing with low necessity can be suppressed.

In the recording medium, in a case where it is determined that the terminal device approaches the target apparatus as compared with an apparatus different from the target apparatus, the processing unit may cancel the warning notification processing.

By doing so, in a case where necessity of warning notification processing is reduced, the warning notification processing can be appropriately canceled.

In the recording medium, in a case where the specified apparatus is not the target apparatus and a distance between the specified apparatus and the terminal device increases, the processing unit may cancel the warning notification processing.

By doing so, in a case where necessity of warning notification processing is reduced, the warning notification processing can be appropriately canceled.

In the recording medium, after notification processing of notifying that the terminal device approaches the target apparatus is performed, the processing unit may cancel the warning notification processing.

As such, a movement of a user can be appropriately assisted by notifying a reason why warning notification processing is canceled.

According to another aspect of the invention, there is provided a terminal device including a communication unit that receives a beacon signal, a processing unit, and a notification unit. After an event to cause the processing unit to transmit a job to a target apparatus occurs, or after a predetermined operation is performed in the terminal device based on the event that is generated by the processing unit in response to a status which is received by the communication unit from the target apparatus, in a case where it is determined that the terminal device moves to an apparatus different from the target apparatus, based on the received radio wave strength of the beacon signal which is received from the target apparatus by the communication unit, the processing unit makes the notification unit perform a warning notification.

According to a still another aspect of the invention, there is provided a warning system including the terminal device described above and the target apparatus described above.

According to a still another aspect of the invention, there is provided a warning notification method including starting a warning mode after an event to transmit a job from a terminal device to a target apparatus occurs or after a predetermined operation is performed in the terminal device after receiving a status from the target apparatus; calculating a first reference distance that is a reference distance between the terminal device and the target apparatus, based on the received radio wave strength of a beacon signal that is received from the target apparatus, and calculating a second reference distance that is a reference distance between the terminal device and a second apparatus, based on the received radio wave strength of the beacon signal that is received from the second apparatus different from the target apparatus; calculating a first distance between the terminal device and the target apparatus, based on the received radio wave strengths of second and subsequent beacon signals that are received from the target apparatus, and calculating a second distance between the terminal device and the second apparatus, based on the received radio wave strengths of the second and subsequent beacon signals that are received from the second device; performing warning notification processing in a case where the first distance is larger than the first reference distance and the second distance is smaller than the second reference distance; and ending the warning mode in a case where it is determined that the first distance is smaller than or equal to a given threshold.

BRIEF DESCRIPTION OF THE DRAWINGS

The invention will be described with reference to the accompanying drawings, wherein like numbers reference like elements.

FIG. 9 illustrates a data structure example of a position beacon.

FIG. 10 illustrates an example of a relationship between a distance and a received radio wave strength.

FIG. 11 is a schematic diagram illustrating a positional relationship between the terminal device, the target apparatus, and the non-target apparatus.

DESCRIPTION OF EXEMPLARY EMBODIMENTS

Hereinafter, the present embodiment will be described. The present embodiment which will be described below does not unreasonably limit content of the invention described in Claims. In addition, all the configurations described in the present embodiment are not limited to indispensable configuration requirements of the invention.

1. Warning System

Figure 1:
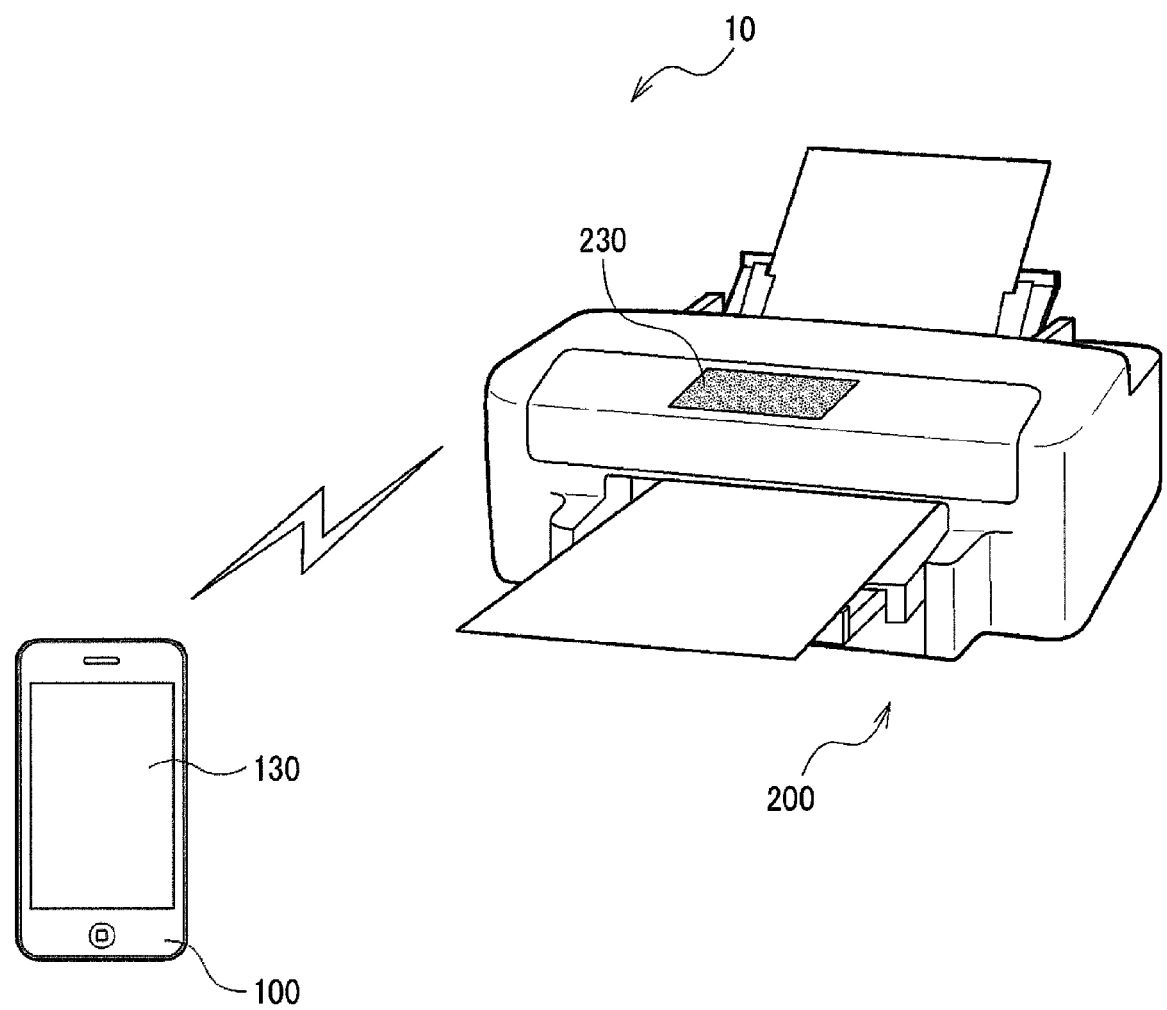
FIG. 1 illustrates a configuration example of a warning system (communication system) including a terminal device and an electronic apparatus.

FIG. 1 is a view schematically illustrating an example of a warning system (communication system) 10 according to the invention. The warning system 10 includes a terminal device 100 and an electronic apparatus 200.

The terminal device 100 is a mobile terminal device such as a smartphone or a tablet terminal. The electronic apparatus 200 is, for example, a printer (print device). Alternatively, the electronic apparatus 200 may be a scanner, a facsimile device, or a copy machine. The electronic apparatus 200 may be a multifunction peripheral (MFP) having a plurality of functions, and the multifunction peripheral having a printing function is also an example of a printer.

The warning system 10 is not limited to a configuration of FIG. 1, and various modifications such as adding other configuration elements can be made for the warning system. The single terminal device 100 may be capable of receiving beacon signals from a plurality of the electronic apparatuses 200. As will be described below with reference to FIG. 5 and the like, one of the plurality of electronic apparatuses 200 becomes a target apparatus 200A. In addition, the beacon signal from the single electronic apparatus 200 may be received by a plurality of the terminal devices 100, and each terminal device 100 may perform determination processing in a warning mode which will be described below. In addition, the point that the modification such as omission or addition of a configuration element can be made is applied to the configuration elements in FIGS. 2 and 3 which will be described below.

The terminal device 100 and the electronic apparatus 200 can perform wireless communication with each other. Here, the wireless communication is a communication conforming to the Bluetooth standard, and is a communication conforming to the Bluetooth Low Energy (BLE) standard in a narrow sense. However, the terminal device 100 and the electronic apparatus 200 can also perform wireless communication according to a standard different from the BLE, for example, a communication conforming to the Wi-Fi (registered trademark) standard.

Figure 2:
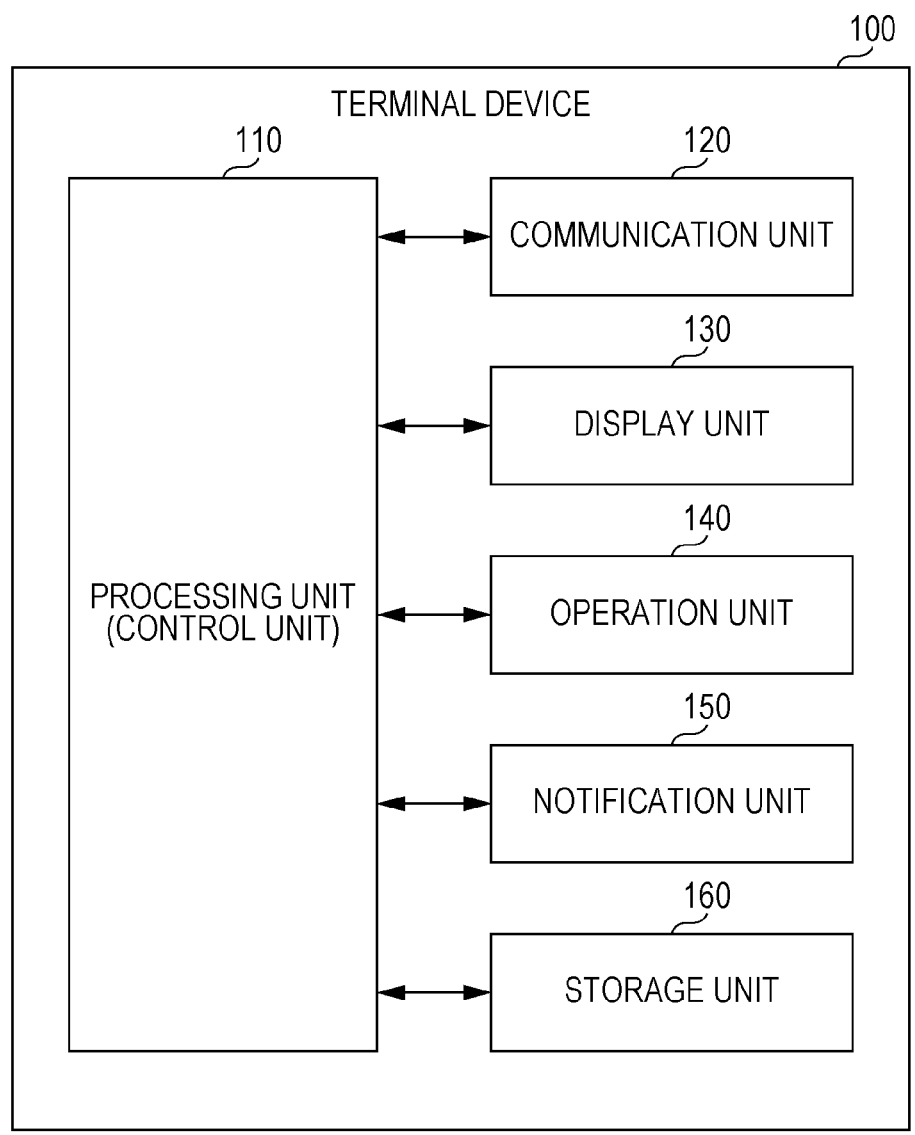
FIG. 2 illustrates a configuration example of the terminal device.

FIG. 2 is a block diagram illustrating an example of a configuration of the terminal device 100. The terminal device 100 includes a processing unit 110 (processor), a communication unit 120 (communication interface), a display unit 130 (display), an operation unit 140 (operation buttons, or the like), a notification unit 150 (notification interface), a storage unit 160 (memory).

The processing unit 110 (a processor or a controller) controls the respective units of the communication unit 120, the display unit 130, the operation unit 140, the notification unit 150, and the storage unit 160.

Each processing (each function) of the present embodiment performed by the processing unit 110 can be realized by a processor (processor including hardware). For example, each processing of the present embodiment can be realized by a processor that operates based on information such as a program and a memory (storage device) that stores information such as a program. Here, the processor, for example, functions of each unit may be realized by individual hardware, or the functions of each unit may be realized by integrated hardware. For example, the processor may include hardware, and the hardware may include at least one of a circuit that processes a digital signal and a circuit that processes an analog signal. For example, the processor can be configured by one or a plurality of circuit devices (for example, an IC and the like) mounted on a circuit substrate and one or a plurality of circuit elements (for example, a resistor, a capacitor, and the like). The processor may be, for example, a central processing unit (CPU). However, the processor is not limited to the CPU, and various processors such as a graphics processing unit (GPU), a digital signal processor (DSP), or the like can be used for the processor. The processor may be a hardware circuit configured with an application specific integrated circuit (ASIC). The processor may be configured by a plurality of CPUs or may be configured by hardware circuits configured with a plurality of ASICs. The processor may be configured by a combination of the plurality of CPUs and a hardware circuit configured with a plurality of ASICs.

The communication unit 120 (wireless communication unit) is realized by at least one communication device (wireless communication device). The communication unit 120 includes a wireless communication device (wireless communication chip) that performs wireless communication conforming to the BLE standard. However, the communication unit 120 may include a wireless communication device that performs a wireless communication conforming to a standard other than the BLE standard.

The display unit 130 is configured by a display and the like that displays various types of information to a user, and the operation unit 140 is configured by a button and the like that receives an input operation from a user. The display unit 130 and the operation unit 140 may be integrally configured with, for example, a touch panel. The notification unit 150 notifies the user. The notification unit 150 may be, for example, a speaker for notifying the user by sound, a vibration unit (vibration motor) for notifying the user by vibration, or a combination thereof.

The storage unit 160 (storage device, memory) stores various types of information such as data or a program. The processing unit 110 and the communication unit 120 operate, for example, the storage unit 160 as a work area. The storage unit 160 may be a semiconductor memory such as an SRAM or a DRAM, a register, a magnetic storage device such as a hard disk drive (HDD), or an optical storage device such as an optical disk device. For example, the storage unit 160 stores a computer readable instruction, and functions of each unit (communication unit, processing unit) of the terminal device 100 are realized by performing the instruction using the processing unit 110 (processor). Here, the instruction may be an instruction of an instruction set configuring a program or an instruction instructing an operation to a hardware circuit of the processing unit 110 (processor).

Figure 3:
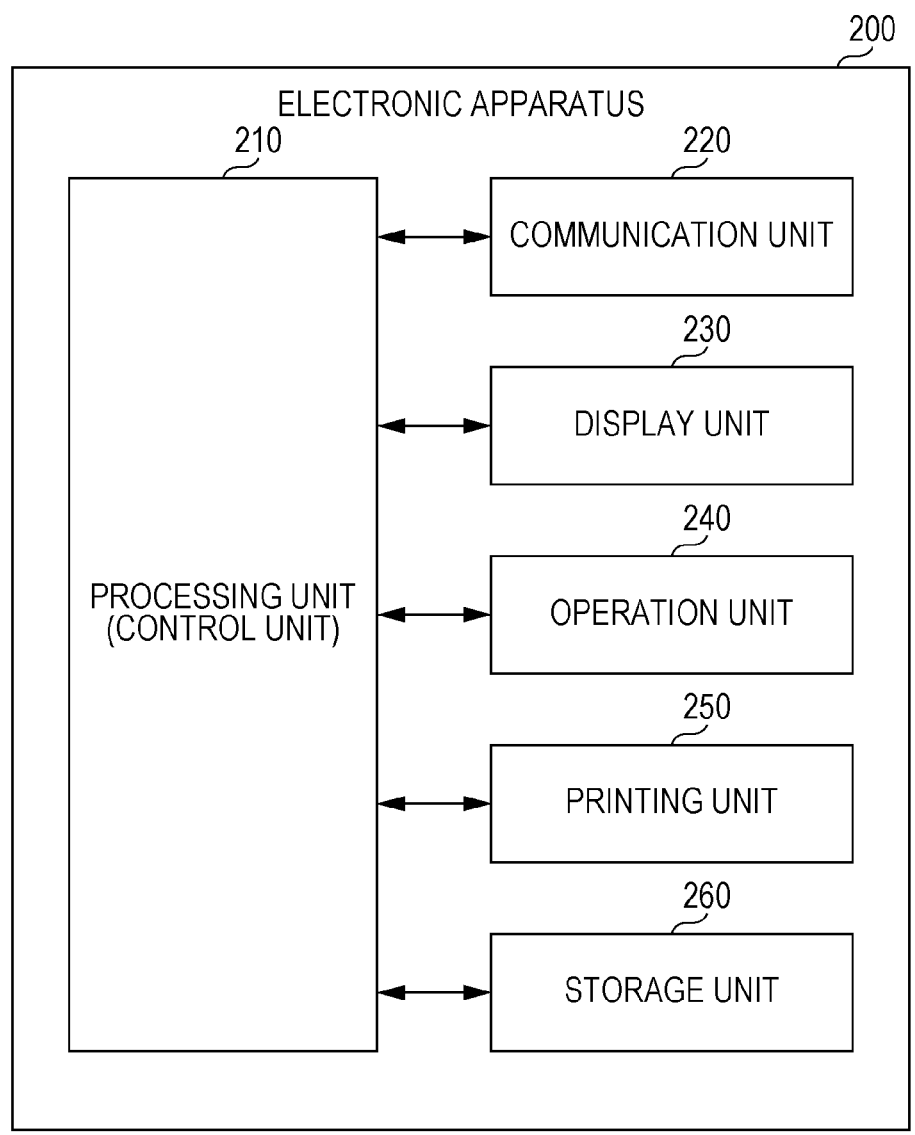
FIG. 3 illustrates a configuration example of the electronic apparatus.

FIG. 3 is a block diagram illustrating an example of a configuration of the electronic apparatus 200. FIG. 3 illustrates an electronic apparatus 200 (printer, multifunction peripheral) having a printing function. However, as described above, the electronic apparatus 200 can be extended to a device other than a printer. The electronic apparatus 200 includes a processing unit 210 (processor), a communication unit 220 (communication interface), a display unit 230 (display), an operation unit 240 (operation panel), a printing unit 250, and a storage unit 260 (memory).

The processing unit 210 (a processor or a controller) controls each unit (a communication unit, a storage unit, a printing unit, and the like) of the electronic apparatus 200 and performs various types of processing of the present embodiment. For example, the processing unit 210 can include a plurality of CPUs (MPUs or microcontrollers) such as a main CPU, a sub CPU, and the like. The main CPU (main control substrate) controls each unit of the electronic apparatus 200 or the entire electronic apparatus. For example, in a case where the electronic apparatus 200 is a printer, the sub CPU performs various types of processing relating to printing. Alternatively, a CPU for communication processing may be further provided.

Each processing (each function) of the present embodiment performed by the processing unit 210 can be realized by a processor (processor including hardware). For example, each processing of the present embodiment can be realized by a processor that operates based on information such as a program and a memory (storage device) that stores information such as a program. Here, in the processor, for example, functions of each unit may be realized by individual hardware, or the functions of each unit may be realized by integrated hardware. For example, the processor may include hardware, and the hardware may include at least one of a circuit that processes a digital signal and a circuit that processes an analog signal. For example, the processor can be configured by one or a plurality of circuit devices (for example, an IC and the like) mounted on a circuit substrate and one or a plurality of circuit elements (for example, a resistor, a capacitor, and the like). The processor may be, for example, a CPU. However, the processor is not limited to the CPU, and various processors such as a GPU or a DSP can be used for the processor. The processor may be a hardware circuit configured by an ASIC. The processor may be configured by a plurality of CPUs or may be configured by a hardware circuit configured by a plurality of ASICs. The processor may be configured by a combination of the plurality of CPUs and the hardware circuit configured by the plurality of ASICs.

The communication unit 220 is realized by at least one communication device (wireless communication device). The communication unit 220 includes a wireless communication device (wireless communication chip) that performs wireless communication conforming to the BLE standard. However, the communication unit 220 may include a wireless communication device that performs wireless communication conforming to a standard other than the BLE standard.

The display unit 230 is configured by a display or the like that displays various types of information to a user, and the operation unit 240 is configured by a button and the like that receives an input operation from the user. The display unit 230 and the operation unit 240 may be integrally configured with, for example, a touch panel.

The printing unit 250 includes a printing engine. The printing engine is a mechanical configuration for printing an image on a print medium. The printing engine includes, for example, a transport mechanism, an ink jet type ejection head, a carriage drive mechanism including the ejection head, and the like. The printing engine prints an image on the print medium by ejecting ink from the ejection head to a print medium (paper or cloth) transported by the transport mechanism. A specific configuration of the printing engine is not limited to the device exemplified here and may be a device that prints an image with toner using a laser method. The printing unit 250 may include a sensor that detects various types of physical quantity relating to working state of the printing engine, a counter that counts the detection result, and the like. By using the sensor and the counter, information such as the amount of drive of the transport mechanism (the amount of rotation of a motor), the number of reciprocations of the ejection head, the amount of ink consumption, and the like can be acquired.

The storage unit 260 (a storage device or a memory) stores various types of information such as data and a program. The processing unit 210 and the communication unit 220 operate the storage unit 260 as, for example, a work area. The storage unit 260 may be a semiconductor memory, a register, a magnetic storage device, or an optical storage device. The storage unit 260 stores data output from the printing unit 250 as information indicating an operation status of a printer.

The storage unit 260 (storage device) may store data transmitted from the terminal device 100 through a wireless communication. The data here is, for example, print data used for printing in the printing unit 250. However, storage of data from the terminal device 100 is not limited to the storage performed by the storage unit 260 embedded in the electronic apparatus 200. For example, the electronic apparatus 200 may include an interface not illustrated, and data from the terminal device 100 may be stored in an external storage device connected via the interface. The external storage device may be, for example, an HDD, a solid state drive (SSD), or a flash memory connected by the Universal Serial Bus (USB), may be an SD card (Includes a storage device of a related standard such as a microSD card) inserted into a card slot, or may be another storage device connectable to the electronic apparatus 200.

2. User Movement Decision

Next, a method according to the present embodiment will be described in detail. First, after an outline of processing is described, a flow of the detailed processing will be described. A distance estimation method in which a received radio wave strength of a beacon signal is used will be described.

2.1 Outline

In a case where a user transmits a job to the given electronic apparatus 200, it is considered that a user moves to the electronic apparatus 200 and confirms (for example, retrieves results of the job) a performance result of the transmitted job. The job here represents a series of processing performed by the electronic apparatus 200 and corresponds to a print job if the electronic apparatus 200 is a printer (an MFP having a printer function). In a case where the user transmits a print job to a given printer, the user moves to the printer to retrieve a printed material which is a performance material.

However, there are many cases where a plurality of electronic apparatuses 200 exist around the user. For example, in an environment such as an office, a plurality of printers (MFPs) are arranged in a floor, and the user who is an employee can use the plurality of printers. In a case where the user transmits a print job to a given printer, it is necessary for the user to move to the printer that is a transmission target of the print job so as to retrieve the printed material. However, in an environment where there are a plurality of printers available to the user, the user may wrongly move to a printer different from the printer to which the job is transmitted.

An apparatus in which a BLE chip is mounted is widely known as disclosed in JP-A-2017-10329. There are also known various methods of estimating a distance between apparatuses by using a beacon signal and performing some processing based on the estimated distance. The beacon signal here is transmitted through a wireless communication and is used for acquiring information such as a position and confirming existence of the apparatus. For example, the beacon signal is transmitted in a state where a transmission destination is not specified and is received by a terminal existing within a range. The beacon signal conforms to a Bluetooth communication standard, and specifically, is an advertisement packet used for broadcasting data. However, the beacon signal can be expanded to a broadcast signal (SSID broadcast) or the like conforming to a Wi-Fi communication standard.

By using the method of JP-A-2017-10329, it is possible to estimate a distance between the electronic apparatus 200 and the portable terminal device 100 carried by the user. Accordingly, it may also be possible to determine whether or not the user completes movement to the electronic apparatus 200 (the target apparatus 200A which is the electronic apparatus 200 to which the user transmits the job). However, JP-A-2017-10329 discloses a method of estimating a distance between apparatuses, a method of displaying a setting screen of an apparatus in the closest distance, a method of performing some processing in a case where the distance is short, and the like, a case where the user moves to the electronic apparatus 200 different from the target apparatus 200A is not considered.

As illustrated in FIG. 2, the terminal device 100 according to the present embodiment includes the communication unit 120 that receives a beacon signal, the processing unit 110, and a notification unit 150. In a narrow sense, the storage unit 160 of the terminal device 100 stores a program, and the program causes a computer (the terminal device 100) to function as the communication unit 120 that receives the beacon signal and the processing unit 110. After an event to cause the communication unit 120 to transmit the job to the target apparatus 200A occurs, the processing unit 110 performs warning notification processing (processing of causing the notification unit 150 to issue a warning), in a case where it is determined that the terminal device 100 moves to an apparatus different from the target apparatus 200A, based on the received radio wave strength of the beacon signal received by the communication unit 120 from the target apparatus 200A. More specifically, the processing unit 110 determines whether or not the terminal device 100 moves to an apparatus different from the target apparatus 200A, based on a distance between the terminal device 100 and the target apparatus 200A determined based on the received radio wave strength.

The warning notification processing here is notification processing for warning a user that the terminal device moves to an apparatus different from the target apparatus 200A. The warning notification processing may be processing of notifying through a sound (warning sound or voice) using a speaker, may be processing of notifying through vibration using a vibration unit (vibration motor), or may be processing of notifying through light using a light emitting unit (an LED or the like). The warning notification processing may be processing of displaying a warning screen on the display unit 130.

As such, by performing the warning notification processing, it is possible to make the user recognize that the terminal device wrongly moves to the electronic apparatus 200 different from the target apparatus 200A. Accordingly, it is possible to make the user appropriately move to the target apparatus 200A or to make the user confirm results of the job (to retrieve the printed material without leaving the printed material, or the like).

Figure 4:
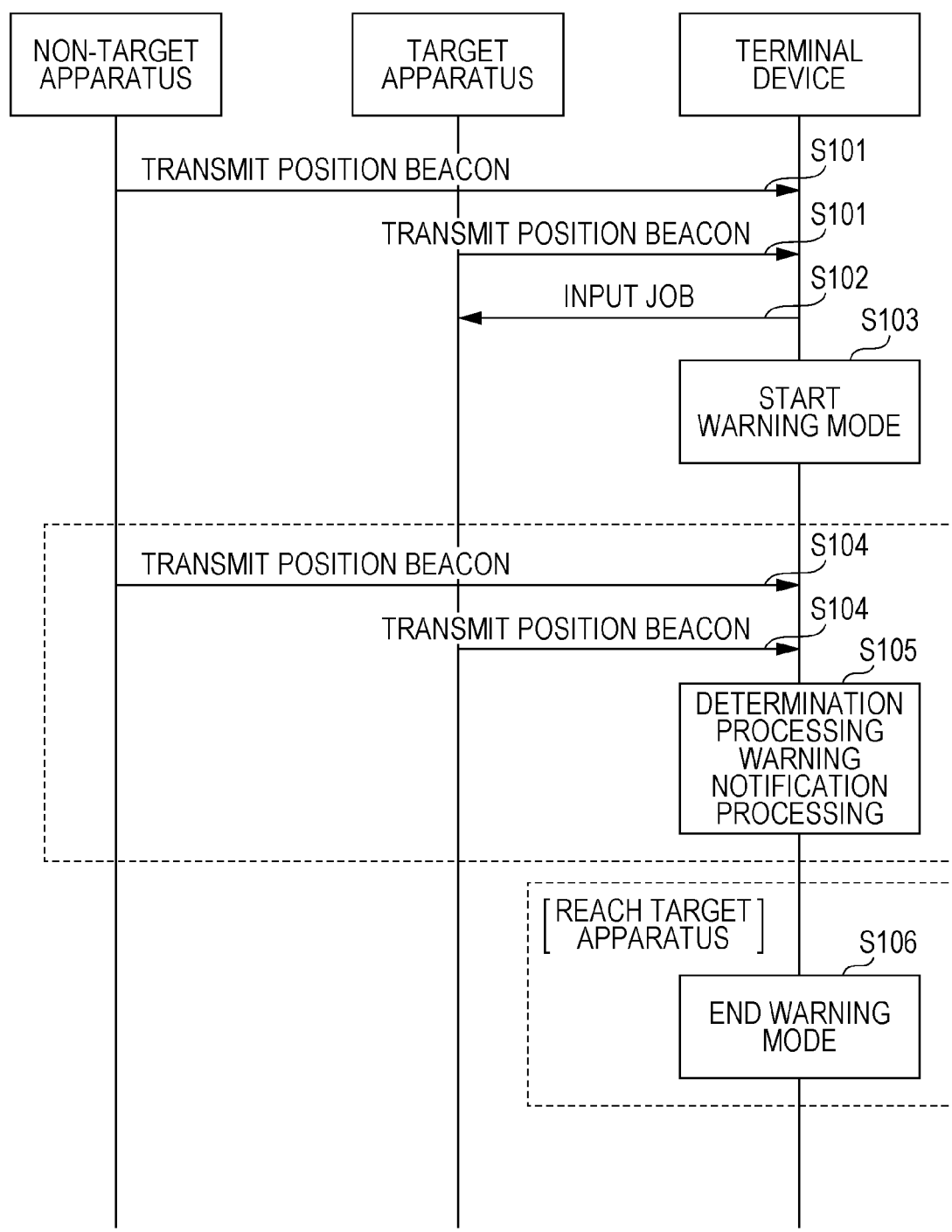
FIG. 4 is a sequence diagram illustrating processing according to the present embodiment.

FIG. 4 is a sequence diagram illustrating an outline of processing according to the present embodiment. Hereinafter, an example will be described in which the electronic apparatus 200 is two apparatuses which are the target apparatus 200A and an apparatus (hereinafter, referred to as non-target apparatus 200B) different from the target apparatus 200A, but the number of the electronic apparatuses 200 may be three or more. That is, the number of the non-target apparatuses 200B may be two or more.

The electronic apparatus 200 (target apparatus 200A and the non-target apparatus 200B) periodically transmits a beacon signal (S101). Hereinafter, the beacon signal for position confirmation transmitted from the electronic apparatus 200 is referred to as a position beacon. During a period before an event to transmit a job to the target apparatus 200A occurs, the terminal device 100 does not perform processing, even if the terminal device receives the position beacon.

If a job is transmitted from the terminal device 100 to the given electronic apparatus 200 (target apparatus 200A) (S102), the terminal device 100 starts a warning mode (S103). Since the terminal device 100 is capable of specifying the electronic apparatus 200 that transmits the job, the terminal device 100 performs processing by setting the electronic apparatus 200 as the target apparatus 200A and setting the other electronic apparatus 200 as the non-target apparatus 200B.

Even after the terminal device 100 starts the warning mode, the target apparatus 200A and the non-target apparatus 200B continues a periodical transmission of the position beacon (S104). The target apparatus 200A and the non-target apparatus 200B do not need to consider whether or not the terminal device 100 starts the warning mode and do not need to consider whether or not the terminal device 100 itself is the target apparatus 200A or the non-target apparatus 200B.

The terminal device 100 operating in the warning mode receives a beacon signal from the electronic apparatus 200 and determines whether or not a user moves to an apparatus different from the target apparatus 200A (S105). The processing of S105 will be described in detail below with reference to FIG. 5 and the like. In a case where it is determined that the user moves to the apparatus different from the target apparatus 200A during the processing of S105, warning notification processing is performed. In S105, whether or not to end the warning mode is determined, and the processing of S104 and the processing of S105 are continued until an end condition is satisfied.

In a case where it is determined that the warning mode ends in S105, specifically, in a case where it is determined that the terminal device 100 used by the user sufficiently approaches the target apparatus 200A, a desirable movement is completed, and thereby, the terminal device 100 ends the warning mode (S106).

In the above description, an example in which an event to transmit a job to the target apparatus 200A occurs is described as a scene where a user needs to move to the target apparatus 200A. However, even in a case where an event to receive a status from the target apparatus 200A occurs, it is considered that the user moves to the target apparatus 200A. The status here is information indicating a state of the target apparatus 200A and is an error status in a narrow sense. In a case where the target apparatus 200A is a printer, a status transmitted from the printer is represents occurrence of out of ink, out of toner, out of print medium (paper, cloth, or the like), paper jam, or the like. The terminal device 100 receives the information indicating the error status (information indicating error content in a narrow sense) from the electronic apparatus 200 in which the error occurs.

In a case where the target apparatus 200A is in the error status, in order to return the target apparatus 200A to a normal status, it is necessary to perform a return work performed by a user such as replenishment of ink, toner, and print medium, or removal of jammed paper. That is, with occurrence of an event to receive the status as a trigger, it is considered that the user moves to the target apparatus 200A, and thus, in a case where the movement to the non-target apparatus 200B is detected, the warning notification processing may be performed. By doing so, it is possible for the user to smoothly perform the return work on the target apparatus 200A.

Various conditions for starting the warning mode in this case are considered. For example, in a case where an event occurs in which the terminal device 100 receives the status from the target apparatus 200A, the warning mode may start immediately. It is because the status such as an error has to be canceled as soon as possible and it is considered that the user starts to move to the target apparatus 200A immediately.

However, there may be a case where the status notified by the target apparatus 200A does not have a serious problem such as no job being performed by the target apparatus 200A or the occurred error is minor. In this case, there is a possibility that the user moves to the target apparatus 200A after the user performs another task with a high priority, and thus, there is a concern that inappropriate warning notification processing is performed by immediately starting the warning mode. Thus, after the processing unit 110 generates an event in response to the communication unit 120 receiving the status from the target apparatus 200A, the warning mode may start with an action made by the user as a trigger. An event generated by the processing unit 110 is, for example, a status notification event. Specifically, the action made by the user is an operation predetermined for the terminal device 100. For example, when receiving a status, an error message is displayed on the display unit 130 of the terminal device 100, and the warning mode starts with an operation of the operation unit 140 made by the user on the display as a trigger. More specifically, the display unit 130 displays a "Yes" button and a "No" button together with a message such as "Ink is low, please refill ink" and the like. In contrast to this, in a case where the user touches the "Yes" button, the warning mode starts, and in a case where the user touches the "No" button, the warning mode does not start. By doing so, the warning mode can start in a case where a probability that the user starts to move to the target apparatus 200A is high, and thus, performing of inappropriate warning notification processing can be suppressed.

As described above, after an event to transmit a job to the target apparatus 200A or an event to receive a status from the target apparatus 200A occurs, the processing unit 110 of the terminal device 100 according to the present embodiment performs the warning notification processing, in a case where it is determined that the user moves to an apparatus different from the target apparatus 200A, based on a distance between the terminal device 100 and the target apparatus 200A. Hereinafter, an event to transmit a job will be mainly described as an example, but the event can be appropriately changed to an event to receive a status.

2.2 Detailed Determination Processing

Next, processing of determining whether or not a user moves to an apparatus different from the target apparatus 200A performed in S105 of FIG. 4 will be described in detail.

Since the user may be capable of being guided to the target apparatus 200A, a distance between the terminal device 100 and the target apparatus 200A is used in the determination processing of the present embodiment. However, as illustrated in FIG. 4, it is assumed that the electronic apparatus 200 outputs a beacon signal (position beacon) regardless of whether the electronic apparatus 200 itself is the target apparatus 200A or the non-target apparatus 200B. Accordingly, the terminal device 100 is capable of receiving the beacon signal from the non-target apparatus 200B and is capable of estimating the distance between the terminal device and the non-target apparatus 200B, based on the beacon signal.

Thus, the processing unit 110 performs the warning notification processing, in a case where it is determined that the terminal device 100 moves to a second device, based on a result of comparison between a first distance between the terminal device 100 and the target apparatus 200A and a second distance between the terminal device 100 and the second device, which is determined based on the received radio wave strength of the beacon signal received by the communication unit 120 from the second device (non-target apparatus 200B) different from the target apparatus 200A.

By doing so, the distance to the non-target apparatus 200B is used in addition to the distance to the target apparatus 200A, and thus, it is possible to accurately determine the movement of a user. Hereinafter, the first distance between the terminal device 100 and the target apparatus 200A is referred to as $L_A$, and the second distance between the terminal device 100 and the non-target apparatus 200B (second device) is referred to as $L_B$. Hereinafter, an example in which the non-target apparatus 200B that is an estimation target of the second distance $L_B$ is one is described, but the non-target apparatus may be two or more.

Even if the distance between the terminal device 100 and the target apparatus 200A (or the non-target apparatus 200B) at a given timing is obtained, with the distance alone, it is not easy to determine whether the user moves to the target apparatus 200A or the non-target apparatus 200B. The reason is that it is difficult to determine whether a situation in which the distance to the target apparatus 200A (the non-target apparatus 200B) is a predetermined value is a result that the terminal device 100 which is originally at a long distance approaches the target apparatus or the terminal device 100 which is originally at a short distance moves away from the target apparatus.

Thus, in a case where the second distance $L_B$ decreases and the first distance $L_A$ increases until the first distance $L_A$ is less than or equal to a given threshold $L_{TH}$, the processing unit 110 performs the warning notification processing.

As such, by using a change (increase or decrease) in a distance, it is possible to appropriately determine the movement of a user. In order not to perform unnecessary warning notification processing, it is also important to determine an end of the warning mode. In a case where the first distance $L_A$ between the terminal device 100 and the target apparatus 200A is less than or equal to the given threshold $L_{TH}$, it is assumed that the user reaches the target apparatus 200A, and the warning mode ends.

Figure 5:
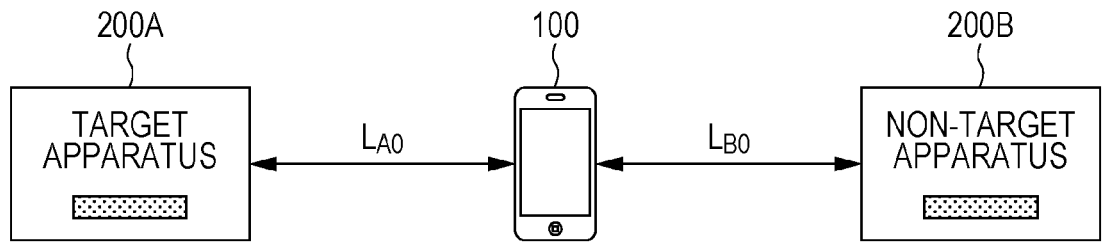
FIG. 5 is a schematic diagram illustrating a positional relationship between the terminal device, a target apparatus, and a non-target apparatus.

FIG. 5 is a schematic diagram illustrating a positional relationship between the terminal device 100, the target apparatus 200A, and the non-target apparatus 200B when an event to transmit a job to the target apparatus 200A or an event to receive a status from the target apparatus 200A occurs (when the terminal device 100 starts a warning mode in a narrow sense). In the present embodiment, a distance in an initial state illustrated in FIG. 5 is used as a reference for an increase or a decrease of the first distance $L_A$ and the second distance $L_B$. Hereinafter, the first distance $L_A$ serving as a reference is referred to as $L_{A0}$, and the second distance $L_B$ serving as the reference is referred to as $L_{B0}$.

Figure 6:
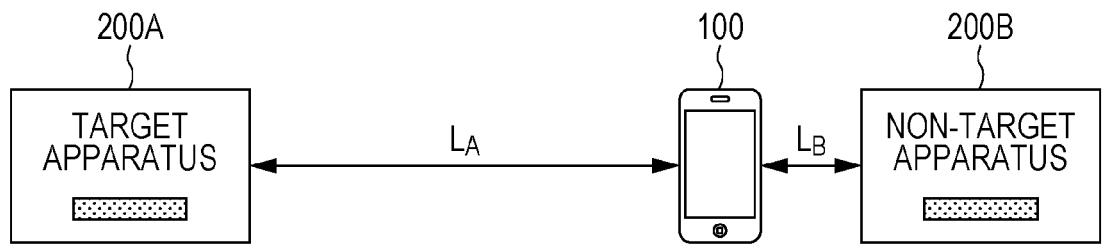
FIG. 6 is a schematic diagram illustrating the positional relationship between the terminal device, the target apparatus, and the non-target apparatus.

FIG. 6 is a schematic diagram illustrating a positional relationship between the terminal device 100, the target apparatus 200A, and the non-target apparatus 200B in a case where a user moves to the non-target apparatus 200B, as compared with the state of FIG. 5. As is apparent from a comparison between FIG. 5 and FIG. 6, $L_B<L_{B0}$ and $L_A>L_{A0}$. That is, in a case where both the first distance $L_A$ and the second distance $L_B$ are used for determination processing, by setting a condition that the second distance $L_B$ decreases and the first distance $L_A$ increases, it is possible to appropriately determine that a user moves to the non-target apparatus 200B.

Figure 7:
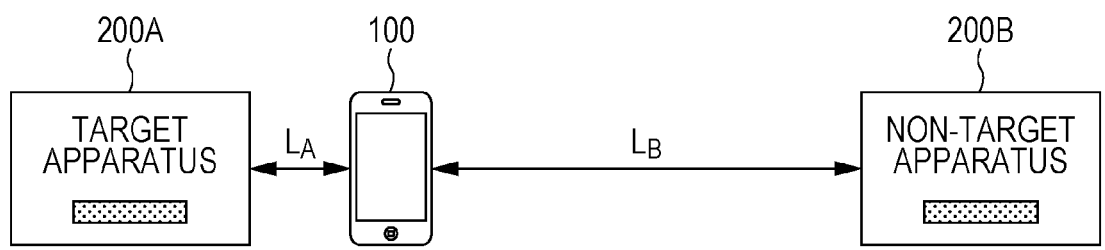
FIG. 7 is a schematic diagram illustrating the positional relationship between the terminal device, the target apparatus, and the non-target apparatus.

FIG. 7 is a schematic diagram illustrating a positional relationship between the terminal device 100, the target apparatus 200A, and the non-target apparatus 200B in a case where a user moves to the target apparatus 200A, as compared with the state of FIG. 5. As is apparent from a comparison between FIG. 5 and FIG. 7, $L_B>L_{B0}$ and $L_A<L_{A0}$. That is, if the user moves in an appropriate direction, at least one of a decrease of the second distance $L_B$ and an increase of the first distance $L_A$ is not satisfied, and thus, the warning notification processing is not performed. In a case where the movement in the appropriate direction is continued as illustrated in FIG. 7 and the first distance $L_A$ is less than or equal to the given threshold $L_{TH}$, it is determined that the movement of the user to the target apparatus 200A is completed and a warning mode ends.

Figure 8:
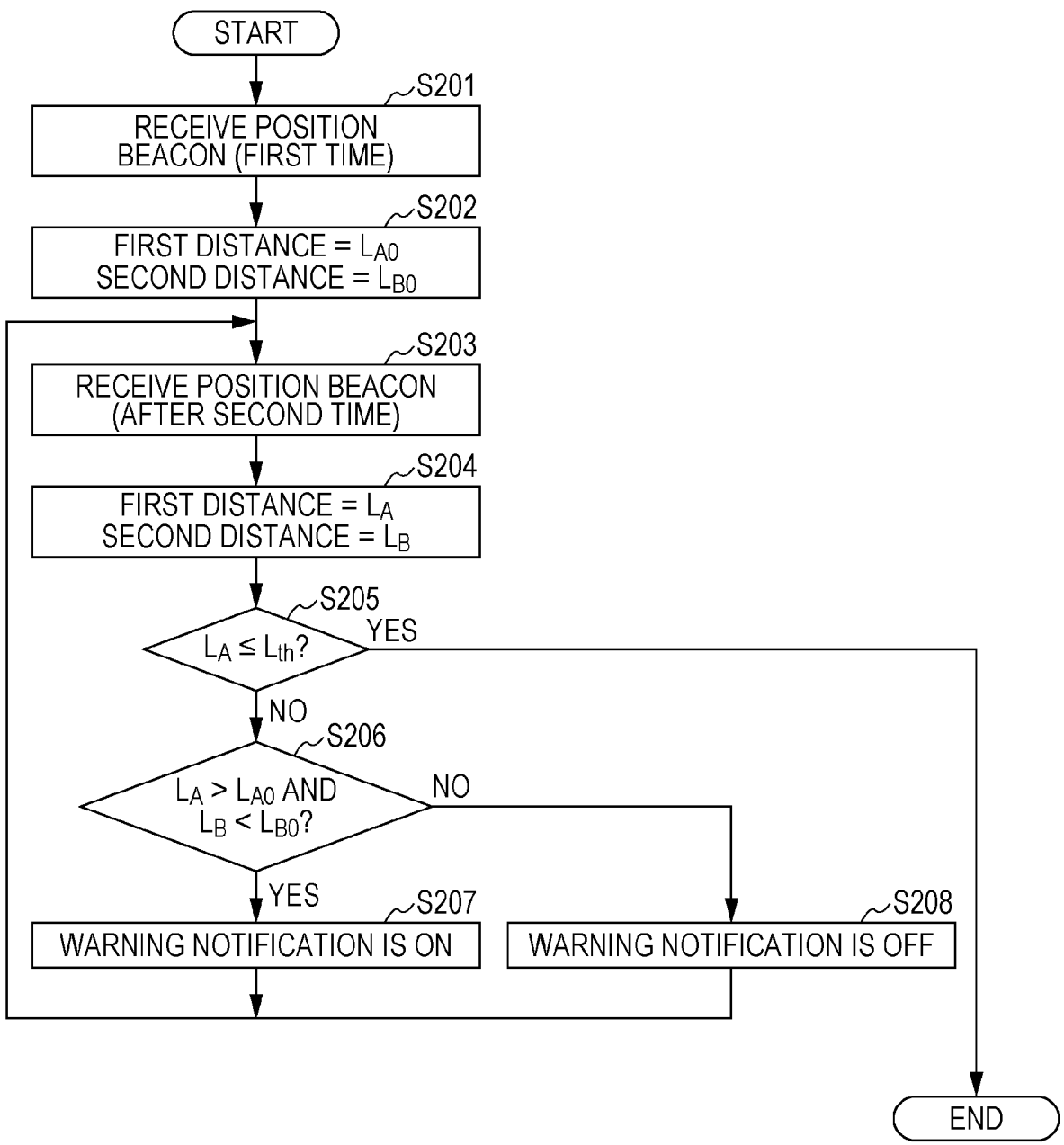
FIG. 8 is a flowchart illustrating processing according to the present embodiment.

FIG. 8 is a flowchart illustrating processing of determining whether or not a user moves to the non-target apparatus 200B in the present embodiment. FIG. 8 is an example of the determination processing, and various modifications such as omitting a part of steps of FIG. 8 or adding a different step can be made. If this processing starts, the position beacon is firstly received (S201).

The terminal device 100 estimates the first distance $L_A$ and the second distance $L_B$, based on the received position beacon (S202). The distance estimated in S202 is a distance corresponding to the initial state illustrated in FIG. 5 and is a reference value of an increase or a decrease. That is, the processing unit 110 sets the first distance $L_A$ estimated in S202 as $L_{A0}$ and the second distance $L_B$ as $L_{B0}$. The processing of S202 will be described in detail together with a data structure of the position beacon.

FIG. 9 illustrates an example of the data structure of the position beacon transmitted from the electronic apparatus 200 (target apparatus 200A and the non-target apparatus 200B). The position beacon includes a beacon identifier, identification information of the electronic apparatus 200, and radio wave strength information serving as a reference of a distance.

The beacon signal can be used for various purposes, and in many cases, a plurality of types of the beacon signals are transmitted and received between the electronic apparatus 200 and the terminal device 100. The beacon identifier is information for specifying in which application the beacon signal is used. The beacon identifier included in the position beacon is information indicating that the beacon signal is the position beacon and is information different from the beacon identifier of the beacon used for other purposes.

The identification information of the electronic apparatus 200 is information for uniquely specifying the electronic apparatus 200. The identification information of the electronic apparatus 200 is, for example, a MAC address of the electronic apparatus 200, but other information may be used.

The radio wave strength information serving as a reference of a distance is information used for estimating a distance between the terminal device 100 and the electronic apparatus 200 in the processing unit 110 of the terminal device 100 that receives the beacon signal.

The processing of S202 is performed by, for example, the following flow. The processing unit 110 of the terminal device 100 determines whether or not the received beacon signal is a position beacon with reference to the beacon identifier. In a case where the beacon signal is the position beacon, the processing unit 110 determines whether the electronic apparatus 200 which is a transmission source of the beacon signal is the target apparatus 200A or the non-target apparatus 200B with reference to the identification information of the electronic apparatus 200. The processing unit 110 estimates the first distance $L_A$, based on the radio wave strength information of the position beacon transmitted from the target apparatus 200A and the received radio wave strength of the position beacon, and estimates the second distance $L_B$, based on the radio wave strength information of the position beacon transmitted from the non-target apparatus 200B and the received radio wave strength of the position beacon. A method of estimating the distances based on the radio wave strength information and the received radio wave strength will be described below.

As described above, since an increase or a decrease in distance is determined in the determination processing of the present embodiment, determination cannot be made only by a first reception. Thus, the terminal device 100 further receives the position beacon (S203) and estimates the first distance $L_A$ and the second distance $L_B$, based on the received position beacon (S204). The processing of S204 is the same as the processing of S202.

Next, the processing unit 110 determines whether or not the first distance $L_A$ is less than or equal to the given threshold $L_{TH}$ (S205). In a case where the first distance $L_A$ is less than or equal to the given threshold $L_{TH}$ (Yes in S205), the processing unit 110 determines that a user reaches the target apparatus 200A and ends the processing. That is, the processing of S106 is performed by leaving a loop of S104 and S105 of FIG. 4.

In a case where the first distance $L_A$ is larger than the given threshold $L_{TH}$ (No in S205), it is determined that the user does not reach the target apparatus 200A. Thus, the processing unit 110 determines whether or not to perform warning notification processing. Specifically, the processing unit determines whether or not $L_B<L_{B0}$ and $L_A>L_{A0}$ (S206) and performs the warning notification processing in a case of Yes (S207). In a case of No, the processing unit does not perform the warning notification processing (S208).

After the processing of S207 or S208 is performed, the processing returns to S203, and the processing based on the position beacon that is received next is continued. In the example of the flowchart of FIG. 8, the processing of S207 includes both processing of starting the warning notification processing that is stopped until then and processing of continuing the warning notification processing that is being performed so far. The processing of S208 includes both processing of canceling the warning notification processing that is being performed so far and processing of continuing stop of the warning notification processing that is stopped so far.

For example, even though a user approaches the target apparatus 200A (FIG. 5→FIG. 7), if the state of FIG. 6 is formed thereafter, it is considered that the user moves to the non-target apparatus 200B, and thereby, the warning notification processing has to be performed. Meanwhile, even though the user moves to the non-target apparatus 200B (FIG. 5→FIG. 6) and thereby the warning notification processing is performed, if the state of FIG. 5 is returned thereafter, the user corrects the movement in the wrong direction and it is estimated that the user moves to the target apparatus 200A. Thus, in that case, the processing unit 110 has to cancel the warning notification processing.

As such, in a case where it is determined that the terminal device 100 approaches the target apparatus 200A as compared with an apparatus different from the target apparatus 200A, the processing unit 110 cancels the warning notification processing. Thereby, unnecessary warning notification processing can be suppressed, and thus, it is possible to prevent a user from feeling annoying. In the example of FIG. 8, in a state where the warning notification processing is previously performed, in a case where it is determined as No in S206 ("$L_B<L_{B0}$ and $L_A>L_{A0}$" is not satisfied), it is determined that "the user approaches the target apparatus 200A as compared with an apparatus different from the target apparatus 200A" and the warning notification processing is canceled. This corresponds to the fact that returning to at least the state of FIG. 5 from the state of FIG. 6 is set as a cancellation condition of the warning notification processing.

However, it is also possible to use a different condition for canceling the warning notification processing. As in a modification example which will be described below, a difference ($\Delta L_A$ and $\Delta L_B$) with the immediately preceding timing may be used, and for example, $\Delta L_A<0$ or $\Delta L_B>0$ may be used as the cancellation condition. In this case, even though return from the state of FIG. 6 to the state of FIG. 5 (even though $L_B<L_{B0}$ and $L_A>L_{A0}$ is continued), if a movement direction is a direction (direction in which a user moves away from the non-target apparatus 200B) in which the user approaches the target apparatus 200A, the warning notification processing is canceled.

In FIG. 8, even if the warning notification processing is being performed or stopped, the determination condition is common (S206), but this can also be modified. For example, while the warning notification processing is performed, whether to continue or cancel the warning notification processing may be determined according to the first condition, and while the warning notification processing is stopped, whether to start or continue to stop the warning notification processing may be determined according to the second condition different from the first condition.

Figure 12:
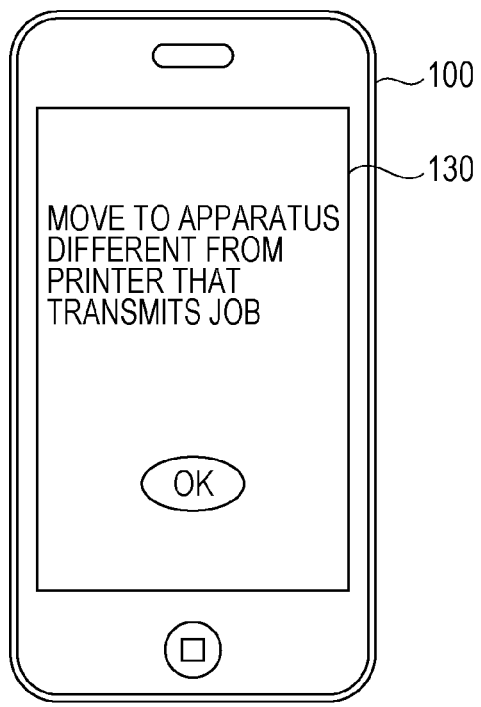
FIG. 12 illustrates an example of a warning screen.

Next, an example of a warning screen in a case where warning notification processing of displaying a warning screen on the display unit 130 is performed will be described. As illustrated in FIG. 12, the warning screen displays, for example, a message indicating that the terminal device 100 moves to the non-target apparatus 200B. In the example of FIG. 12, the display unit 130 displays text information such as "moving to an apparatus different from a printer that transmits a job".

However, the warning screen is not limited to FIG. 12, and various modifications can be made. For example, the processing unit 110 may perform warning notification processing of notifying information indicating the first distance $L_A$ between the terminal device 100 and the target apparatus 200A and information indicating a direction of the target apparatus 200A. The direction of the target apparatus 200A is a direction in which a position of the terminal device 100 is used as a reference, and is, for example, a direction from the terminal device 100 to the target apparatus 200A.

Figure 13:
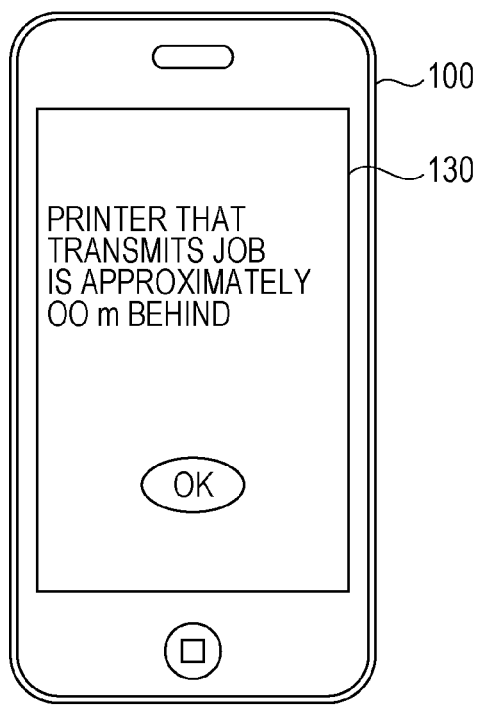
FIG. 13 illustrates an example of the warning screen.

FIG. 13 illustrates an example of the warning screen for notifying the first distance $L_A$ and the direction of the target apparatus 200A. In the example of FIG. 13, the display unit 130 displays text information such as "printer that transmits a job is approximately OO m behind". As such, by displaying a rough distance and direction with respect to the target apparatus 200A, it is possible to appropriately assist movement of a user to the target apparatus 200A. In addition to the text information illustrated in FIG. 13, the display unit 130 may display text information such as "moving to an apparatus different from the printer that transmits a job" illustrated in FIG. 12.

The first distance $L_A$ can be obtained in a unit which is easy to understand, such as meters, for example, by a method which will be described below with reference to FIG. 9. As described above with reference to FIG. 8, $L_A>L_{A0}$ is a condition for performing a warning notification in the determination processing in which both the first distance $L_A$ and the second distance $L_B$ are used. That is, in a case where a front side and a rear side are defined by using a travel direction of the terminal device 100 as a reference, it is considered that a probability that the target apparatus 200A is located at the rear side is high. The front side represents a range including the travel direction of the terminal device 100, and the rear side is a range including a reverse direction of the travel direction. Particularly, in a case where $\Delta L_A<0$ is set as a cancellation condition of a warning notification as described above, a state in which the warning notification is on is a state in which the terminal device 100 does not approach the target apparatus 200A, and thus, there is a high probability that the target apparatus 200A is located behind a user. Thus, the movement of the user can be assisted by displaying the warning screen of FIG. 13. Here, the rear side represents, for example, a range of ±90° with respect to the reverse direction of the travel direction, with a certain width.

Although FIG. 13 illustrates an example of displaying both the distance and the direction, display of the direction may be omitted. For example, there is a case where a condition for turning on the warning notification again is satisfied regardless of the warning notification being changed from on to off. Particularly, in a case where $\Delta L_A<0$ or $\Delta L_B>0$ is set as the condition for canceling the warning notification as described above, on and off of the warning notification can be frequently changed. In this case, a state is estimated in which a user does not move in a certain direction and wanders without knowing a position of the target apparatus 200A. In this case, it is preferable to notify not only the information such as "moving to an apparatus different from a printer that transmits a job" illustrated in FIG. 12, but also additional information for assisting the movement of the user. However, since it is estimated that the movement direction is not fixed, it is not easy to notify the direction illustrated in FIG. 13. In this case, the display unit 130 may display the text information such as "the printer that transmits a job is at a distance of approximately OO m".

In a case where processing of canceling the warning notification processing illustrated in S208 is performed, the processing unit 110 performs processing of not displaying the warning screen of FIG. 12 or 13. The processing unit 110 may perform processing of displaying a screen prior to displaying the warning screen on the display unit 130 or may perform processing of displaying another screen on the display unit 130.

Figure 14:
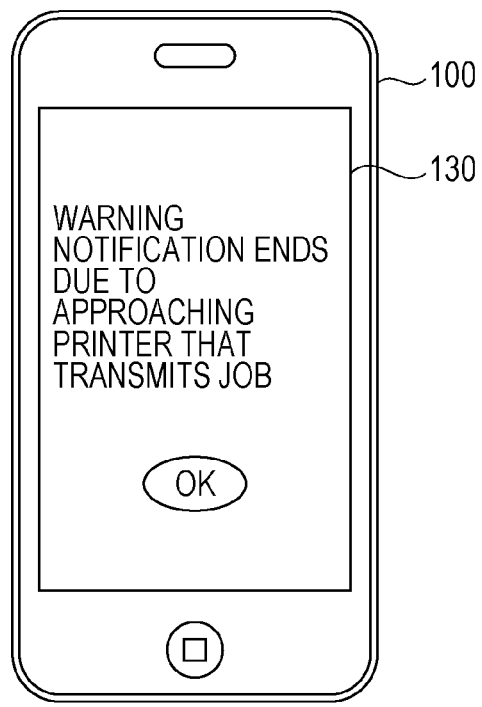
FIG. 14 illustrates an example of a screen displayed on a display unit when warning notification processing ends.

At this time, the processing unit 110 may cancel the warning notification processing after notification processing of notifying that the terminal device 100 approaches the target apparatus 200A is performed. FIG. 14 is an example of a notification screen for notifying that the terminal device 100 approaches the target apparatus 200A. In the example of FIG. 14, the display unit 130 displays text information such as "warning notification ends because of approaching a printer that transmits a job". The processing unit 110 performs processing of switching from display of the warning screen illustrated in FIG. 12 or 13 to display of the screen illustrated in FIG. 14. Thereby, it is possible to clearly represent a reason for ending the warning notification processing. A transition from the screen of FIG. 14 to another screen may trigger an operation of a user such as pressing an OK button of the terminal device 100 or may trigger passage of time. When a warning mode itself ends, for example, in a case where it is determined as Yes in S205, a screen corresponding to FIG. 14 may be displayed. That is, in a case of sufficiently approaching the target apparatus 200A, the processing unit 110 may perform processing of notifying that the warning mode ends due to the reason.

2.3 Distance Estimation Based on Radio Wave Strength

Next, determination processing of a distance based on a beacon signal will be described. As illustrated in FIG. 9, the beacon signal (the position beacon, specifically, the advertisement packet) transmitted from the electronic apparatus 200 includes information on a radio wave strength (signal strength value) serving as a reference of the distance. The terminal device 100 can acquire an actual received radio wave strength (received signal strength) at the time of receiving the beacon signal.

The processing unit 110 compares the received signal strength with a signal strength value serving as a reference of a distance included in the beacon signal. The signal strength value serving as the reference of the distance is a received signal strength (RSSI: Received Signal Strength Indication) of the beacon signal in a receiving side apparatus when the receiving side apparatus is installed at a position separated by a distance serving as a reference from a transmitting side apparatus of the beacon signal. In the example in which the beacon signal (advertise packet) of a BLE standard is used, the transmitting side apparatus is a broadcaster and the receiving side apparatus is an observer. A reference distance is, for example, 1 m, but may be set as a different distance.

FIG. 10 illustrates an example of a relationship between a distance from an apparatus that transmits the beacon signal and a radio wave strength of the beacon signal received at each distance. Generally, it is known that a radio wave strength becomes weak in inverse proportion to a square of the distance. Thus, if the radio wave strength (the above-mentioned signal strength value) at a reference distance is known, a distance between the terminal device 100 and the electronic apparatus 200 can be calculated based on the radio wave strength of the beacon signal actually received. The processing unit 110 stores a relational expression corresponding to FIG. 10 in the storage unit 160 and calculates the distance by inserting substituting the reference signal strength value and the received signal strength actually measured into the expression. Alternatively, the distance may be obtained by storing a relationship of FIG. 10 in the storage unit 160 as a table (look-up table) and extracting appropriate data from the table, based on the reference signal strength value and the received signal strength actually measured.

As illustrated in FIG. 8, the terminal device 100 makes two types of determination, which are a determination whether or not the first distance $L_A$ is less than or equal to the threshold $L_{TH}$ (S205) and a determination whether or not $L_B < L_{B0}$ and $L_A > L_{A0}$ (S206). With the method of directly obtaining the first distance $L_A$ and the second distance $L_B$, the processing of S205 is realized by comparing the obtained $L_A$ and the threshold $L_{TH}$, and the processing of S206 is realized by a comparison between $L_A$ and $L_{A0}$, and $L_B$ and $L_{B0}$. However, at least one of the processing of S205 and the processing of S206 may be realized without directly calculating the distance.

For example, the reference distance of the signal strength value included in the beacon signal is made to match the threshold value $L_{TH}$ of the distance used in S205. For example, if the threshold used for determination in S205 is "1 m", the received signal strength at the time of installing an observer at a position separated by 1 m from a broadcaster is included in the beacon signal (position beacon). In this case, the processing unit 110 compares the signal strength value with the received signal strength of the beacon signal. If the received signal strength is larger than or equal to the reference signal strength value, the first distance $L_A$ can be determined to be less than or equal to the given threshold $L_{TH}$, and if the received signal strength is smaller than the reference signal strength value, the first distance $L_A$ can be determined to be larger than the given threshold $L_{TH}$. The processing unit 110 may perform comparison processing of the radio wave strength, and it is unnecessary to directly calculate the distance itself, thus, a processing load can be reduced.

The determination in S206 can also be realized by comparing the received radio wave strengths. For example, the storage unit 160 of the terminal device 100 stores the received radio wave strength (the received radio wave strength of the position beacon received in S201 in the example of FIG. 8) in a reference state. In this case, if the received radio wave strength (in the example of FIG. 8, the received radio wave strength of the position beacon received in S 203) of the position beacon at each timing is larger than the reference received radio wave strength, it can be determined that $L_A < L_{A0}$ (or $L_B < L_{B0}$). If the received radio wave strength of the position beacon at each timing is less than or equal to the reference received radio wave strength, it can be determined that $L_A \geq L_{A0}$ ($L_B \geq L_{B0}$). That is, the determination of the distance in the present embodiment includes a case where determination is made by actually obtaining a distance using a mathematical expression or a table, and also includes a case where determination is made based on comparison processing of the radio wave strength.

3. Modification Example

Several modification examples will be described below.

3.1 Modification Example of Determination Processing

First to fourth modification examples will be described as modification examples of determination processing on whether or not a user moves to the non-target apparatus 200B.

3.1.1 First Modification Example (Determination Using Threshold)

In the above description, the warning notification processing is performed in a case where the first distance $L_A$ increases and the second distance $L_B$ decreases from an initial state (FIG. 5) which is set as a reference. However, in this case, even if the first distance $L_A$ slightly increases from the initial state (the second distance $L_B$ decreases), the warning notification processing is performed. For example, an operation is considered in which, in a state where a user holds the terminal device 100 by hand, the user raises the terminal device 100 to a position close to the face so as to perform a job transmission operation (S102 in FIG. 4), and after the operation is completed, an arm is lowered and the position of the terminal device 100 is lowered around the waist. In this example, a state in which the terminal device 100 is raised to the vicinity of the face is an initial state of FIG. 5, and when the arm is lowered, the determination processing after S203 of FIG. 8 starts in some cases. Depending on the direction in which the arm is lowered, a condition of $L_B<L_{B0}$ and $L_A>L_{A0}$ is satisfied. However, since the above operation is a natural operation for the user and there is no intention to move to the non-target apparatus 200B, it is not preferable to perform the warning notification processing.

Thus, in a case where the second distance $L_B$ decreases by a second threshold $\delta_B$ or more and the first distance $L_A$ increases until the first distance $L_A$ becomes a value smaller than or equal to the given threshold $L_{TH}$, the processing unit 110 performs the warning notification processing. Alternatively, in a case where the second distance $L_B$ decreases and the first distance $L_A$ increases by a third threshold $\delta_A$ or more until the first distance $L_A$ becomes a value smaller than or equal to the given threshold $L_{TH}$, the processing unit 110 performs the warning notification processing. Alternatively, in a case where the second distance $L_B$ decreases by the second threshold value $\delta_B$ or more and the first distance $L_A$ increases by the third threshold value $\delta_A$ or more, the processing unit 110 may perform the warning notification processing.

The case where the second distance $L_B$ decreases by the second threshold value $\delta_B$ or more is specifically a case where $L_B<L_0-\delta_B$ ($L_{B0}-L_B>\delta_B$). The case where the first distance $L_A$ increases by the third threshold value $\delta_A$ or more is specifically a case where $L_A>L_{A0}+\delta_A$ ($L_A-L_{A0}>\delta_A$). Here, $\delta_A$ and $\delta_B$ are both positive values. By doing so, if the amount of change with respect to the reference is small (if the amount is less than $\delta_A$ and $\delta B$), the warning notification processing is not performed, and thus, unnecessary warning notification processing can be suppressed.

3.1.2 Second Modification Example (Determination Using Only First Distance)

In the above description, the determination processing using both the first distance $L_A$ with the target apparatus 200A and the second distance $L_B$ with the non-target apparatus 200B are described. However, the processing unit 110 may use only the distance $L_A$ with the target apparatus 200A as a processing target.

Specifically, in a case where the distance $L_A$ increases until the distance $L_A$ between the terminal device 100 and the target apparatus 200A becomes a value smaller than or equal to the given threshold $L_{TH}$, the processing unit 110 of the terminal device 100 determines that the terminal device 100 moves to an apparatus (the non-target apparatus 200B) different from the target apparatus 200A, and performs the warning notification processing. In this case, since it is not necessary for the terminal device 100 to use the non-target apparatus 200B as a processing target, a processing load can be reduced.

In the present modification example, since estimation of the second distance $L_B$ between the non-target apparatus 200B and the terminal device 100 is unnecessary, the electronic apparatus 200 that is the non-target apparatus 200B can omit transmission of the position beacon. Specifically, in the present modification example, unlike the example of FIG. 4, each electronic apparatus 200 does not periodically transmit (constantly transmit) the position beacon. In a case where a job is transmitted from the terminal device 100 or in a case where a status is transmitted to the terminal device 100, the electronic apparatus 200 determines that the device itself is the target apparatus 200A and starts to transmit the position beacon. In a case where the warning mode ends (in a case where the first distance $L_A$ is smaller than or equal to the given threshold $L_{TH}$), the terminal device 100 notifies the target apparatus 200A of the point, and in a case where the notification is received, the target apparatus 200A ends transmission of the position beacon. The notification from the terminal device 100 may be performed by a communication conforming to the BLE standard or may be performed by a communication conforming to another standard (for example, a Wi-Fi standard). By doing so, the electronic apparatus 200 that transmits the position beacon can be limited to the target apparatus 200A, and thus, a communication load of the electronic apparatus 200 can be reduced.

3.1.3 Third Modification Example (Update of Reference Distance)

In the above description, an example in which $L_{A0}$ which is a reference of the first distance $L_A$ and $L_{B0}$ which is a reference of the second distance $L_B$ is the distance estimated in the initial state (FIG. 5) is described, and the reference of the distance is not limited to this.

For example, the processing unit 110 may make a determination based on the distance at the immediately preceding timing. Specifically, a difference $\Delta L_A=L_A(t)-L_A(t-1)$ between the first distance $L_A(t)$ at a given timing t and the first distance $L_A(T-1)$ at the immediately preceding timing t−1 is obtained. In a case where $\Delta L_A>0$, it can be determined that a user moves away from the target apparatus 200A, and in a case where $\Delta L_A<0$, it can be determined that the user approaches the target apparatus 200A. in the same manner, in a case where $\Delta L_B=L_B(t)-L_B(t-1)$, and in a case where $\Delta L_B>0$, it can be determined that the user moves away from the non-target apparatus 200B, and in a case where $\Delta L_B<0$, it can be determined that the user approaches the non-target apparatus 200B.

In this case, regardless of absolute values ($L_A(t)$ and $L_B(t)$) of the distance at that time, the determination is made based on the movement direction. Accordingly, it is possible to realize determination processing having characteristics different from a case where an initial state is used as a reference. For example, a situation is considered in which the user returns slightly in a reverse direction for some reason in the state of FIG. 7 (state in which the user approaches the target apparatus 200A from the initial state). In a case where the initial state is used as a reference, even if the latest movement is made in the reverse direction (direction in which the user moves to the non-target apparatus 200B), it is determined that the user approaches the target apparatus 200A as a whole, and thus, the warning notification processing is not performed. In contrast to this, in a case where $\Delta L_A$ or $\Delta L_B$ is used by updating the reference at any time, even in a case where the user approaches the target apparatus 200A as compared with the initial state, if the latest movement is the movement to the non-target apparatus 200B, the warning notification processing is performed.

Which determination is preferable depends on the situation, and thus, the processing unit 110 may be configured to be able to switch whether to fix the reference of the distance to the initial state or to update the reference at any time, depending on the situation.

In a case where $\Delta L_A$ or $\Delta L_B$ is used, if $\Delta L_A>0$ or $\Delta L_B<0$ is set as a condition of the warning notification processing, in a case where the user slightly moves, or even if an error occurs in estimating the distance, there is a concern that the warning notification processing is performed. Thus, in the same manner as in the first modification example, determination processing in which the threshold is used like $\Delta L_A>\delta_A$ or $\Delta L_B<-\delta_B$ may be performed. Alternatively, the warning notification processing may be performed in a case where determination results such as $\Delta L_A>0$ ($\Delta L_A>\delta_A$) or $\Delta L_B<0$ ($\Delta L_B<-\delta_B$) continue for a predetermined number of times.

3.1.4 Fourth Modification Example (Determination of Closest Terminal)

The processing unit 110 specifies an apparatus having the closest distance to the terminal device 100, based on the first distance between the terminal device 100 and the target apparatus 200A and the second to Nth distances which are determined based on the received radio wave strength of the beacon signal received from the communication unit 120, from the second to Nth (N is an integer of 2 or more) apparatuses different from a target apparatus, and in a case where the specified apparatus is not the target apparatus 200A, the warning notification processing may be performed. That is, in the present modification example, in a case where an apparatus having a closest distance to the terminal device 100 is the non-target apparatus 200B, it is determined that a user moves to the non-target apparatus 200B.

FIG. 11 is a schematic diagram illustrating a positional relationship between the terminal device 100, the target apparatus 200A, and the non-target apparatus 200B. In a case of the positional relationship illustrated in FIG. 11, even in a case where the user appropriately moves toward the target apparatus 200A, the apparatus having a closest distance to the terminal device 100 is the non-target apparatus 200B until the user approaches the target apparatus 200A to some extent (for example, until being in the state similar to FIG. 5). In the present modification example for determining the closest apparatus, there is a concern that the warning notification processing is performed for the user who moves appropriately, according to the positional relationship between the terminal device 100, the target apparatus 200A, and the non-target apparatus 200B.

Thus, in a case where the specified apparatus (apparatus determined to be at the closest distance to the terminal device 100) is not the target apparatus 200A, and in a case where the distance between the specified apparatus and the terminal device 100 increases, the processing unit 110 cancels the warning notification processing.

Specifically, in a case where a reference value (initial value) of the distance to the specified apparatus (non-target apparatus 200B) is set as $L_{B0}$, the processing unit 110 sets $L_B>L_{B0}$ as a condition and cancels the warning notification processing. Alternatively, a combination with the third modification example is made, $\Delta L_B>0$ is set as a condition, and the warning notification processing is canceled. In the example of FIG. 11, if the user appropriately moves toward the target apparatus 200A, and if the user exceeds a position of the non-target apparatus 200B, the distance to the non-target apparatus 200B increases thereafter. Accordingly, unnecessary warning notification processing can be quickly canceled. Also in this case, displaying a notification screen illustrated in FIG. 14 before the warning notification processing is canceled is not hindered.

Alternatively, the processing unit 110 may perform the warning notification processing on condition that the specified apparatus is not the target apparatus 200A and the distance to the specified apparatus is smaller than or equal to a given threshold. By doing so, even if the closest apparatus is the non-target apparatus 200B, the warning notification processing is not performed unless the user approaches the non-target apparatus 200B sufficiently. Accordingly, it is possible to prevent the warning notification processing with low necessity from being performed in a case where an appropriate movement is made.

Alternatively, the processing unit 110 may perform the warning notification processing on condition that the specified apparatus is not the target apparatus 200A and a state is continuing for a given period. Specifically, the processing unit 110 performs the warning notification processing in a case where a state in which it is determined that the specified apparatus is not the target apparatus 200A is continued for the given period. By doing so, even though the closest apparatus is the non-target apparatus 200B, if the state is canceled within the given period, the warning notification processing is not performed. Accordingly, in a case where an appropriate movement is made, it is possible to prevent the warning notification processing with low necessity from being performed. Furthermore, the fact that the distance to the specified apparatus is smaller than or equal to the given threshold may be added to the condition. For example, in a case where the specified apparatus is not the target apparatus 200A and a state in which it is determined that a distance between the terminal device 100 and the specified apparatus is smaller than or equal to the given threshold is continued for the given period, the processing unit 110 performs the warning notification processing. By doing so, even if the closest apparatus is the non-target apparatus 200B, the warning notification processing is not performed unless the state in which a user approaches the non-target apparatus 200B is maintained. Accordingly, in a case where an appropriate movement is made, it is possible to prevent the warning notification processing with low necessity from being performed.

However, there is also a case where the target apparatus 200A and the non-target apparatus 200B are arranged side by side. In this case, a state is maintained in which the terminal device 100 approaches the target apparatus 200A, and thereby, there is a concern that a state in which the second distance $L_B$ to the non-target apparatus 200B is smaller than or equal to the threshold is continued for a given period. That is, in a case where a user appropriately moves to the target apparatus 200A, the warning notification processing is performed, and there is a concern that it is erroneously recognized that the user does not approach the target apparatus 200A. Thus, in a case where a state in which the second distance $L_B$ to the non-target apparatus 200B that is the closest apparatus is smaller than or equal to the threshold is continued for the given period and the first distance $L_A$ to the target apparatus 200A is larger than or equal to a fourth threshold, the processing unit 110 may perform the warning notification processing. By doing so, even if the terminal device 100 stays in the vicinity of the non-target apparatus 200B, in a case where the terminal device is close to the target apparatus 200A, the warning notification processing is not performed, and thus, it is possible to suppress an erroneous determination of the user. The fourth threshold here is a threshold for determining that the terminal device 100 approaches the target apparatus 200A to some extent, and is for example, several meters. However, in a case where the warning mode ends, it is not necessary to make a decision regarding a warning notification in the first place, and thereby, the fourth threshold is larger than the threshold $L_{TH}$ in S205.

Figure 15:
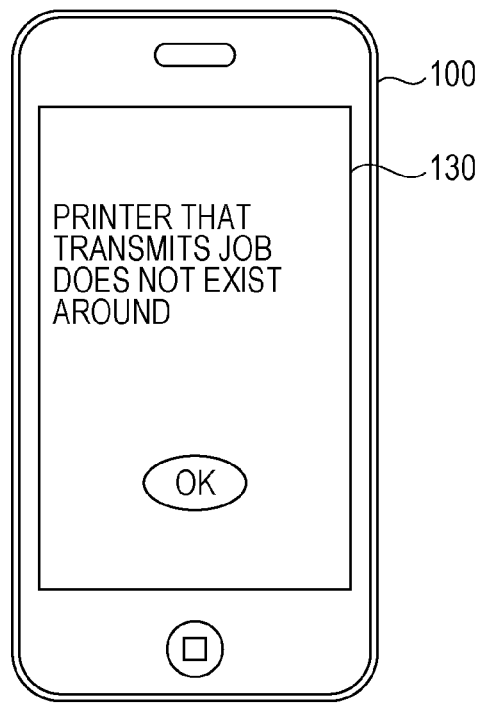
FIG. 15 illustrates an example of the warning screen.

FIG. 15 is an example of a warning screen in a case where the warning notification processing is performed based on the determination in which the fourth threshold is used. In this case, it is determined that the target apparatus 200A does not exist within a range smaller than or equal to the fourth threshold at least from the terminal device 100. Thus, the display unit 130 displays text information such as "a printer that transmits a job does not exist around". Thereby, it possible to clearly represent that the target apparatus 200A does not exist in the vicinity of the terminal device 100.

3.2 Electronic Apparatus, System, Program

In the above description, an example of the printer or the multifunction peripheral (MFP) is described as the electronic apparatus 200, and the electronic apparatus 200 is not limited thereto. For example, the electronic apparatus 200 may be a robot. Depending on a production line, there is a case where the robot and a person (user) work together in a coordinated manner. For example, the robot performs processing (for example, processing such as assembling) on a given workpiece, and also performs a work of disposing the processed workpiece on a pallet at a predetermined position. Then, the user performs an operation such as retrieving the pallet, inspecting a performance material, transporting to a place where the next step is performed.

In this case, it is considered that the user transmits the job that instructs a work content to the robot and moves to the robot for retrieving the performance material. A plurality of robots are used in a general production line in some cases, and there is a concern that the user moves to a robot which does not transmit the job. That is, even in a case where the target apparatus 200A (the electronic apparatus 200) is the robot, the advantage of applying the method according to the present embodiment is great.

The target apparatus 200A (electronic apparatus 200) may be an apparatus which is target to be moved by the user, and may be an apparatus such as a projector, a biometric information measurement apparatus (a pulse rate meter, a pedometer, an activity meter, or the like), a video apparatus (camera or the like), or a physical quantity measurement apparatus.

As illustrated in FIG. 1, the method according to the present embodiment can be applied to the warning system 10 including the terminal device 100 and the target apparatus 200A (electronic apparatus 200).

A part or most of the processing of the terminal device 100 and the electronic apparatus 200 according to the present embodiment may be realized by a program. In this case, the terminal device 100 or the like according to the present embodiment is realized by a processor such as a CPU that executes a program. Specifically, a program stored in a non-transitory information storage medium is read, and the read program is executed by the processor such as the CPU. Here, the information storage medium (a computer readable medium) stores a program, data, and the like, and a function thereof can be realized by an optical disk (DVD, CD, or the like), a hard disk drive (HDD), a memory (a card type memory, a ROM, or the like) or the like. The processor such as the CPU performs various types of processing according to the present embodiment, based on the program (data) stored in the information storage medium. That is, the information storage medium stores a program (a program for causing a computer to perform processing of each unit) for causing a computer (a device including an operation unit, a processing unit, a storage unit, and an output unit) to function as each unit of the present embodiment.

The method according to the present embodiment can be applied to a warning notification method of giving a warning notification to a user that uses the terminal device 100. In the warning notification method according to the present embodiment, a predetermined operation is performed for the terminal device 100 after an event to transmit a job from the terminal device 100 to the target apparatus 200A occurs or after a status is received from the target apparatus 200A, and thereafter, a warning mode starts. The first reference distance $L_{A0}$ that is a reference distance between the terminal device 100 and the target apparatus 200A is obtained based on the received radio wave strength of a beacon signal received from the target apparatus 200A, and the second reference distance $L_{B0}$ that is a reference distance between the terminal device 100 and a second apparatus is obtained, based on the received radio wave strength of the beacon signal received from the second apparatus different from the target apparatus 200A. Furthermore, the first distance $L_A$ between the terminal device 100 and the target apparatus 200A is obtained based on the received radio wave strengths of second and subsequent beacon signals received from the target apparatus 200A, and the second distance $L_B$ between the terminal device 100 and the second apparatus is obtained based on the received radio wave strength of the second and subsequent beacon signals received from the second device. In a case where the first distance $L_A$ is larger than the first reference distance $L_{A0}$ and the second distance $L_B$ is smaller than the second reference distance $L_{B0}$, the warning notification processing is performed, and in a case where it is determined that the first distance $L_A$ is smaller than or equal to the given threshold $L_{TH}$, the warning mode ends. That is, the warning notification method according to the present embodiment implements each step illustrated in S201 to S207 of FIG. 8.

Although the embodiments to which the invention is applied and the modification examples thereof are described above, the invention is not limited to each embodiment and the modification examples thereof as it is, and in the implementation stage, configuration elements can be modified and embodied within a range without departing from the gist of the invention. In addition, various inventions can be formed by appropriately combining a plurality of configuration elements disclosed in each embodiment and modification example described above. For example, some configuration elements may be removed from all the configuration elements described in each embodiment and modification examples. Furthermore, the configuration elements described in different embodiments and modification examples may be appropriately combined. furthermore, in the specification or the drawings, a term described at least once and together with a different term which is broader or equivalent can be replaced with a different term in any part of the specification or the drawings. As such, various modifications and applications can be made within a range without departing from the gist of the invention.

The entire disclosure of Japanese Patent Application No. 2017-204897, filed Oct. 24, 2017 and No. 2018-129677, filed Jul. 9, 2018 are expressly incorporated by reference herein.

What is claimed is:

1. A non-transitory computer-readable recording medium for recording a program causing a terminal device to function as
a communication unit that receives
a first beacon signal from a first apparatus as a target apparatus, and
a second beacon signal from a second apparatus different from the target apparatus; and
a processing unit,
wherein, after an event to cause the communication unit to transmit a job to the first apparatus occurs, or after a predetermined operation is performed in the terminal device based on the event that is generated by the processing unit in response to a status which is received by the communication unit from the first apparatus, in a case where it is determined that the terminal device moves to the second apparatus, based on a first radio wave strength of the first beacon signal and a second radio wave strength of the second beacon signal, the processing unit performs warning notification processing.

2. The recording medium according to claim 1,
wherein the processing unit determines whether or not the terminal device moves to the second apparatus, based on:
a first distance between the terminal device and the first apparatus which is determined based on the first radio wave strength, and
a second distance between the terminal device and the second apparatus which is determined based on the second radio wave strength.

3. The recording medium according to claim 2,
wherein, in a case where the first distance increases until the first distance becomes greater than or equal to a given threshold, the processing unit determines that the terminal device moves to the second apparatus and performs the warning notification processing.

4. The recording medium according to claim 2,
wherein, in a case where it is determined that the terminal device moves to the second apparatus, based on a comparison result of the first distance and the second distance, the processing unit performs the warning notification processing.

5. The recording medium according to claim 4,
wherein, in a case where the second distance decreases and the first distance increases until the first distance becomes greater than or equal to a given threshold, the processing unit performs the warning notification processing.

6. The recording medium according to claim 4,
wherein, in a case where the second distance decreases to a second threshold or more and the first distance increases until the second distance becomes smaller than or equal to the given second threshold, the processing unit performs the warning notification processing.

7. The recording medium according to claim 4,
wherein, in a case where the second distance decreases and the first distance increases to a third threshold or more until the first distance becomes greater than or equal to the given third threshold, the processing unit performs the warning notification processing.

8. The recording medium according to claim 4,
wherein the processing unit performs the warning notification processing of notifying information indicating the first distance and information indicating a direction of the first apparatus.

9. The recording medium according to claim 2,
Wherein the communication unit is configured to receive a third beacon signal corresponds to a third apparatus that is different from the first and the second apparatus; and
wherein the processing unit specifies an apparatus having a closest distance to the terminal device, based on the first distance, the second distance and a third distance that is determined based on a third radio wave strength of the third beacon signal, and performs the warning notification processing in a case where the specified apparatus is not the first apparatus.

10. The recording medium according to claim 9,
wherein, in a case where a state in which the specified apparatus is not the first apparatus is continued for a given period and the first distance is larger than or equal to a fourth threshold, the processing unit performs the warning notification processing.

11. The recording medium according to claim 9,
wherein, in a case where the specified apparatus is not the first apparatus and a distance between the specified apparatus and the terminal device increases, the processing unit cancels the warning notification processing.

12. The recording medium according to claim 1,
wherein, in a case where it is determined that the terminal device approaches the first apparatus as compared with the second apparatus, the processing unit cancels the warning notification processing.

13. The recording medium according to claim 12,
wherein, after notification processing of notifying that the terminal device approaches the first apparatus is performed, the processing unit cancels the warning notification processing.

14. A terminal device that communicates with a first apparatus and a second apparatus comprising:
a communication unit that receives a first beacon signal from the first apparatus and a second beacon signal from the second apparatus;
a processing unit; and
a notification unit,
wherein, after an event to cause the communication unit to transmit a job to the first apparatus occurs, or after a predetermined operation is performed in the terminal device based on the event that is generated by the processing unit in response to a status which is received by the communication unit from the first apparatus, in a case where it is determined that the terminal device moves to the second apparatus, based on a first radio wave strength of the first beacon signal and a second radio wave strength of the second beacon signal which are received by the communication unit, the processing unit makes the notification unit perform a warning notification.

15. A warning system comprising:
the terminal device according to claim 14; and
the first apparatus according to claim 14.

16. A warning notification method comprising:
starting a warning mode after an event to transmit a job from a terminal device to a first apparatus as a target apparatus occurs or after a predetermined operation is performed in the terminal device after receiving a status from the first apparatus;
calculating a first reference distance that is a reference distance between the terminal device and the first apparatus, based on a first radio wave strength of a first beacon signal that is received from the first apparatus, and calculating a second reference distance that is a reference distance between the terminal device and a second apparatus, based on a second radio wave strength of a second beacon signal that is received from the second apparatus different from the first apparatus;
calculating a first distance between the terminal device and the first apparatus, based on the first radio wave strengths of second and subsequent first beacon signals that are received from the first apparatus, and calculating a second distance between the terminal device and the second apparatus, based on the second radio wave strengths of the second and subsequent second beacon signals that are received from the second device;
performing warning notification processing in a case where the first distance is larger than the first reference distance and the second distance is smaller than the second reference distance; and
ending the warning mode in a case where it is determined that the first distance is smaller than or equal to a given threshold.

* * * * *